United States Patent [19]

Ziv et al.

[11] Patent Number: 4,492,348
[45] Date of Patent: Jan. 8, 1985

[54] PROTRACTIVE FORCE RESPONSIVE SAFETY BELT LOCKING APPARATUS

[75] Inventors: Avraham Ziv, Sepulveda; Akira Tanaka, Northridge, both of Calif.

[73] Assignee: American Safety Equipment Corporation, Troy, Mich.

[21] Appl. No.: 343,896

[22] Filed: Jan. 29, 1982

[51] Int. Cl.³ .................. B65H 75/48; B65H 75/42; B60R 21/10; A62B 35/02

[52] U.S. Cl. .................. 242/107.2; 242/107.4 A; 280/804; 280/806; 280/807; 297/478; 297/479; 297/480

[58] Field of Search .............. 242/107.2, 107.4 C, 242/107.4 A, 107.4 B, 107.4 R; 280/801, 802, 804, 806, 807, 808; 297/476, 477, 478, 479, 480

[56] References Cited

U.S. PATENT DOCUMENTS

| 3,467,337 | 9/1969 | Putman | 242/107.2 X |
|---|---|---|---|
| 3,504,867 | 4/1970 | Stevenson | 242/107.2 |
| 3,765,700 | 10/1973 | Littmann | 297/476 X |
| 3,851,837 | 12/1974 | Griffin | 242/107.4 C X |
| 3,876,164 | 4/1975 | Dully | 297/478 X |
| 3,885,812 | 5/1975 | DeLavenne | 297/477 |
| 3,911,535 | 10/1975 | Mauron | 297/478 X |
| 3,918,658 | 11/1975 | Beller | 242/107.4 R |
| 4,208,770 | 6/1980 | Takada | 242/107.2 X |
| 4,286,759 | 9/1981 | Usami et al. | 242/107.2 |
| 4,327,881 | 5/1982 | Fohl | 242/107.2 |
| 4,350,313 | 9/1982 | Adomeit | 242/107.4 C |
| 4,394,034 | 7/1983 | Murphy et al. | 242/107.2 X |

FOREIGN PATENT DOCUMENTS

| 532494 | 2/1973 | Fed. Rep. of Germany . | |
| 2215846 | 8/1974 | France . | |
| 2226840 | 11/1974 | France . | |
| 2383677 | 3/1978 | France . | |
| 1097178 | 12/1967 | United Kingdom | 297/476 |
| 2042053 | 9/1980 | United Kingdom | 242/107.2 |

Primary Examiner—Philip R. Coe
Assistant Examiner—Scott J. Haugland
Attorney, Agent, or Firm—Poms, Smith, Lande & Rose

[57] ABSTRACT

A locking apparatus for use with safety belts of the type protracted and retracted on a spool which is locked by inertia forces in an emergency. The safety belt passes through a clamping assembly which is activated upon sliding movement of the retractor reel from protraction forces in the locked state greater than a pre-established threshold amount.

5 Claims, 5 Drawing Figures

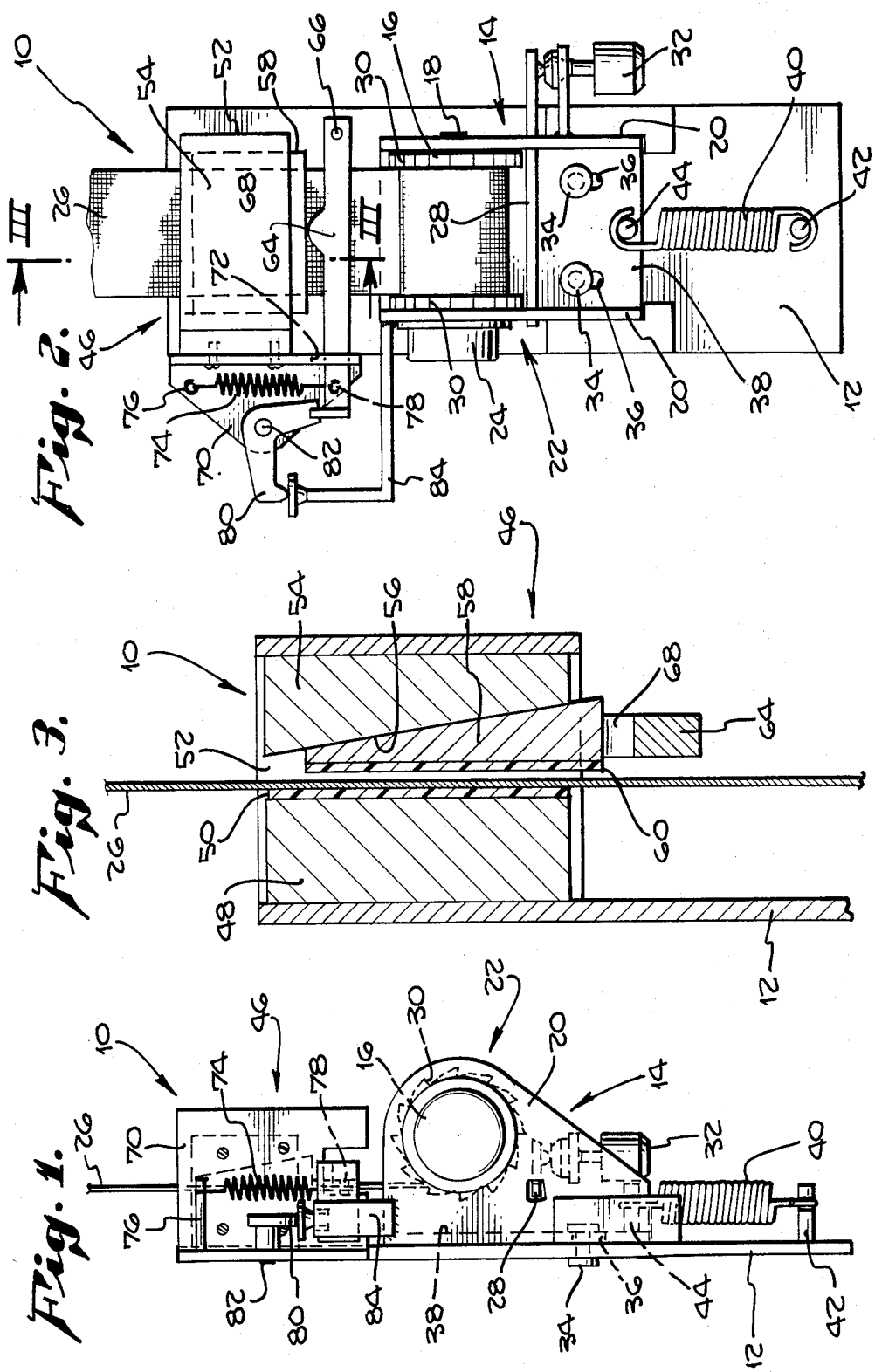

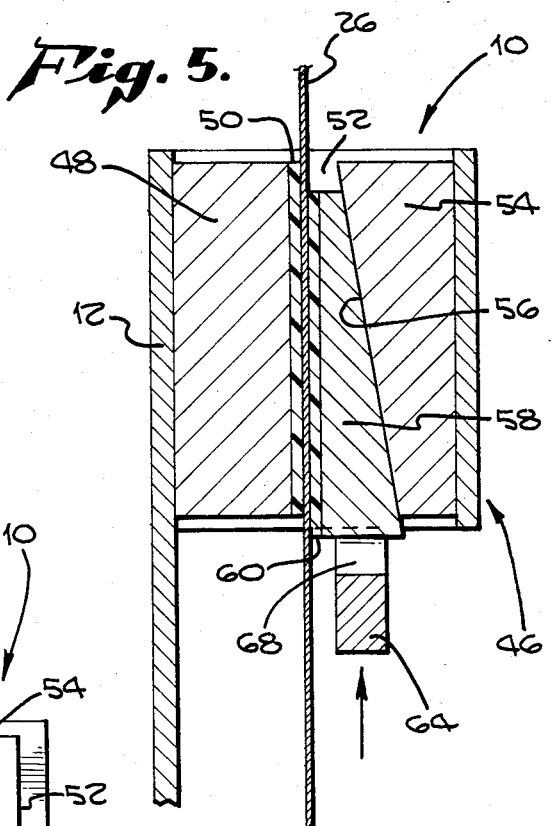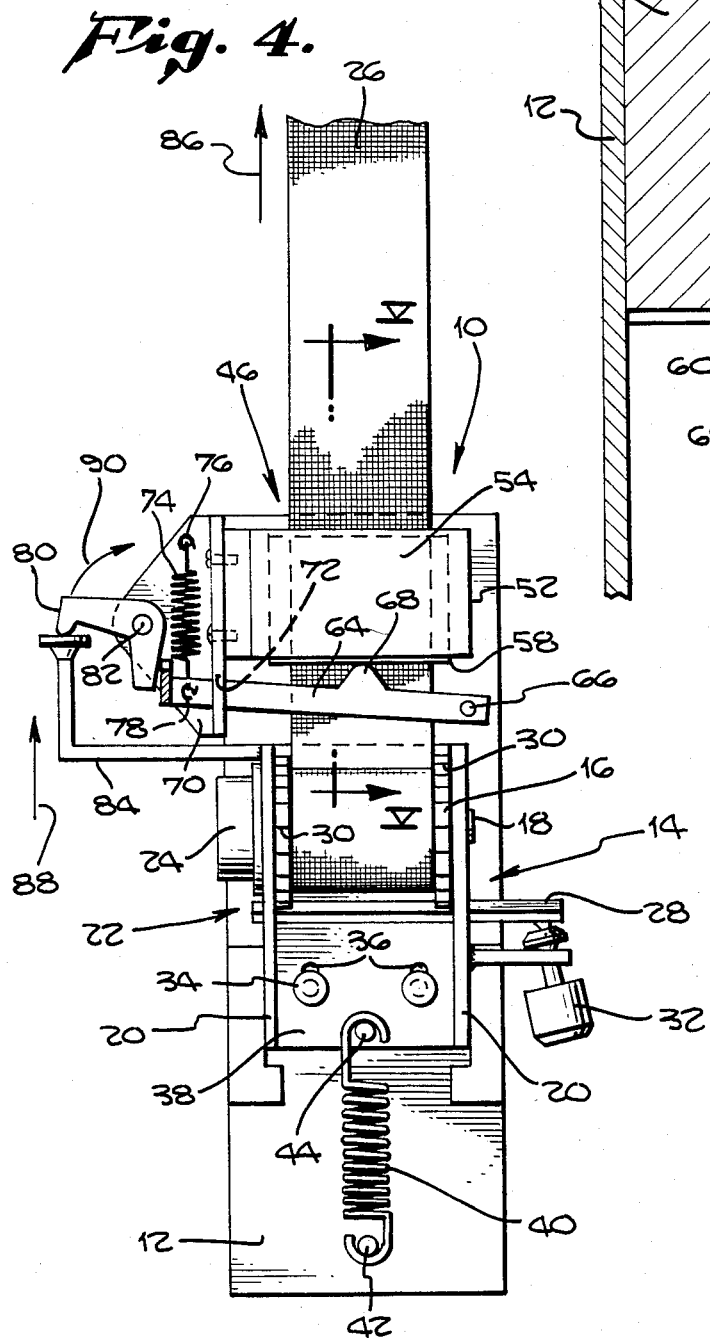

PROTRACTIVE FORCE RESPONSIVE SAFETY BELT LOCKING APPARATUS

BACKGROUND OF THE INVENTION

The present invention relates to safety belt systems employed in automobiles and the like for restraining passengers in their seats during emergency conditions and, more particularly, to safety belt restraint devices employed for restraining a single safety belt and employing a reel from which the safety belt is protracted and retracted.

The use of safety belts for occupant restraint in vehicles has been known for many years. In an effort to secure the benefits of such systems, there has been a constant effort in the industry to improve the systems in order to make them better in operation while, at the same time, of minimal interference to the occupant so as to promote their increased use.

Many such safety belt systems in present used employ a spring-wound reel at one end of the safety belt around which the safety belt is wound for protraction and retraction. Such systems offer relatively unconfined freedom of movement for the occupant during normal conditions. In an emergency condition, the reel is locked by an appropiate mechanism to prevent protraction of the belt and thereby restrain the occupant for the duration of the emergency. The primary locking of the reel is often accomplished by an inertia responsive device such that the occupant is restrained during periods of excessive acceleration and deceleration, as well as upon a striking force against the vehicle from the side.

In studying such systems, it has been found that upon the locking of the reel itself, a certain amount of protraction of the safety belt can still occur depending on the manner in which the belt is wound about the reel and its relative compactness. That is, the belt may slide along itself, compacting the layers on the reel, for a given amount of time. In co-pending application Ser. No. 227,275 filed Jan. 28, 1981, by co-inventor Avraham Ziv herein and entitled SAFETY BELT WEBBING EMERGENCY LOCKING APPARATUS, an improvement to such devices was shown for preventing such continued protraction following lockup of the reel. In the apparatus of that invention, a clamping wedge is disposed in front of the reel, having the seat belt pass therethrough. A second inertia responsive device is connected to activate the clamping wedge so as to directly clamp the belt upon a second level of inertia being encountered greater than that necessary to primarily lockup the reel.

Heavier individuals tend to compact the layers of seat belt upon the reel and achieve protraction after lockup to a greater degree than lighter individuals. This weight or force responsive protraction is independent of the degree of inertia involved. Wherefore, it is the object of the present invention to provide an alternate embodiment to the invention of the aforementioned application which alternate embodiment is responsive protraction forces on the seat belt webbing itself following primary lockup rather than inertia forces on the vehicle.

SUMMARY

The foregoing objectives have been met in an inertia responsive locking seat belt retractor for a vehicle having a frame mounted to the vehicle, a toothed retractor reel having a safety belt webbing wound thereon for protraction and retraction mounted to the frame and an inertia-activated pawl mounted to the frame for engaging the reel to prevent protraction of the safety belt in an emergency by the improvement comprising clamping means carried by the frame and having the safety belt passing operably therethrough for selectively clamping the safety belt against further movement relative to the clamping means; and, means operably connected to said clamping means for operating said clamping means to clamp the safety belt against further relative movement in response to a protraction force on the safety belt which exceeds a predetermined threshhold amount.

More specifically, a wedge-shaped clamp member is mounted in front of the retractor reel and has the seat belt passing therethrough. The retractor reel is slide-mounted and spring-biased to a deactivated position. Upon lockup due to the primary inertia-responsive mechanism, the protraction force on the seat belt tends to pull the reel assembly towards the wedge-shaped clamp member against the force of the bias spring. Upon the protracting force exceeding the bias force of the spring, the retractor moves forward to cause the wedge-shaped clamp member to clamp and hold the seat belt. In one embodiment, a separate spring-loaded locking mechanism is tripped by the movement of the retractor reel requiring it to be reset.

DESCRIPTION OF THE DRAWINGS

FIG. 1 is a side elevation of a seat belt retractor mechanism incorporating the present invention in a first embodiment.

FIG. 2 is a front elevation of the seat belt retractor of FIG. 1.

FIG. 3 is a cutaway side view of the seat belt retractor of FIG. 2 in the plane III—III.

FIG. 4 is a front elevation of the seat belt retractor of FIG. 1–3 shown in its locked position.

FIG. 5 is a cutaway side view of the retractor of FIG. 4 in the plane V—V.

DESCRIPTION OF THE PRESENT INVENTION IN TWO EMBODIMENTS

Referring first to FIGS. 1–3, a seat belt retractor 10 is shown incorporating the present invention in a first embodiment. Retractor 10 comprises a frame 12 adapted to be mounted vertically to the vehicle as at a door post or the like. An inertia-activated retractor reel assembly, generally indicated as 14, is slidably mounted to the frame 12. Reel assembly 14 is, itself, of a generally known variety wherein a toothed reel 16 is journal-mounted on shaft 18 between the parallel side members 20 of a generally U-shaped mounted member 22. A spring (not shown) is contained within housing 24 to spring-bias the reel 16 towards the protracted position. The seat belt webbing 26 is attached to and wound about the toothed reel 16 such that as the seat belt webbing 26 is protracted, the spring within spring housing 24 is wound tighter to retract the seat belt webbing 26 onto toothed reel 16 by revolving it in the opposite direction as the protracting force thereon is released. A pawl member 28 is disposed against the teeth 30 on reel 16 to be forced into engagement therewith to, thereby, lock the toothed reel 16 against further protraction by pendulum 32 during a state of inertial force above a preselected amount. According to the present invention, however, rather than the mounting member 22 being firmly and fixedly attached to the frame 12, mounting member 22 is mounted by attaching rivets 34 through elongated slots 36 in the backplate 38 of mounting member 22. The elongated slots have sufficient clearance around rivets 34 to allow the mounting member 22 and, thereby, the entire inertia-activated retractor reel assembly 14, to slide vertically up and down over a distance of about ⅜ of an inch. A spring 40 is attached between a first post 42 on the frame 12 and a second post 44 on the backplate 38 to, thereby, bias the retractor reel assembly 14 in the down or disengaged position with respect to the clamp assembly to be described hereinafter.

A clamp block assembly 46 is disposed above the inertial-activated retractor reel assembly 14. Clamp block assembly 46 comprises a backblock 48 attached to the frame 12 and having a front bearing surface 50 of a non-chafing material at the level of the seat belt webbing 26 and parallel thereto over which the seat belt webbing 26 passes during protraction and retraction thereof. A pair of parallel spaced side members 52 are attached to the backblock 48 on either side of the seat belt webbing 26 extending thereabove. A fixed wedging block is connected to the two side members spaced from the seat belt webbing 26. Fixed wedging block 54 has a wedging surface 56 sloping towards the seat belt webbing 26 is the upward direction. A movable wedge 58 is disposed between the wedging surface 56, the side members 52, and the top of the seat belt webbing 26. Movable wedge 58 has a first outer surface 60 parallel to the seat belt webbing 26 and a second outer surface 62 parallel to the wedging surface 56 of fixed wedging block 54. So constructed, it will be understood that as the movable wedge 58 is moved upward, the spacing between the first outer surface 60 and the seat belt webbing 26 will be increasingly diminished until the seat belt webbing 26 is firmly gripped between the front surface 50 of backblock 48 and the first outer surface 60 of movable wedge 58. Surfaces 50 and 60 are preferably of a high-strength, resilient material having a high coefficient of friction.

An activator bar 64 is disposed below the movable wedge 58. Activator bar 64 is rotatably mounted to frame 12 at pivot point 66. A projection 68 is disposed to contact the lower surface of movable wedge 58. At the side opposite pivot point 66, an L-shaped mounted member 70 is attached to side member 52. The end of actuator bar 64 passes through a slot 72 in the mounting member 70. A spring 74 is connected between a first post 76 on mounting member 70 and a second post 78 on the end of actuator bar 64 opposite the pivot point 66. Spring 74 thus tends to bias the actuator bar 64 and pivot point 66, in particular, against the movable wedge 58, tending to force it into clamping juxtaposition with the seat belt webbing 26. Bell crank 80 is disposed to pivot around pivot point 82 adjacent the end of actuator bar 64 and to be movable to a position as shown in FIG. 2 wherein actuator bar 64 is held in a cocked position against the bias of spring 74 with the movable wedge 58 in a clearance position with respect to the seat belt webbing 26 as shown in FIG. 3.

The details of clamp block assembly 46 shown heretofore are substantially identical to that portion of the invention shown in the above-mentioned co-pending application of Avraham Ziv, The co-inventor herein. That portion of the apparatus per se, therefore, forms no part of the present invention in and of itself. The point of novelty of the present invention resides in the apparatus to be described hereinafter which causes the activating force of the clamp block assembly 46 to be entirely different. Whereas in the above-mentioned co-pending patent application, the bell crank 80 was moved by inertial forces, in the present application, the bell crank is moved as a result of the protractional forces on the seat belt webbing 26 and, in particular, as a result of the movement of the inertia-actuated retractor reel assembly 14 in the manner previously described as a result of tension in the seat belt webbing 26 following lockup of the reel 16.

To effect this operation, an actuator arm 84 is connected to the mounting member 22 of reel assembly 14 on one end and extends to contact the end of the bell crank 80 which is not in locked engagement with the actuator bar 64. The actual operaton of the apparatus under emergency conditions can been seen with reference to FIGS. 4 and 5. In an emergency situation, inertial force on the pendulum 32 rotates the pawl member 28 into engagement with the teeth 30 of the toothed reel 16 preventing further rotation thereof. Upon the application of a further protracting force on the seat belt webbing 26 as indicated by the arrow 86, the mounting member 22 is pulled upward against the force of spring 40 by virtue of the slidable mounting of the attaching rivets 34 in the elongated slots 36. As the mounting member 22 moves upward, so also does the actuator arm 84 as indicated by the arrow 88. In so doing, the bell crank 80 is rotated clockwise as indicated by the arrow 90. In rotating, the opposite end of the bell crank 80 comes out of engagement with the end of actuator bar 64 allowing spring 74 to move actuator bar 64 upward, pivoting clockwise about the pivot point 66, and thereby allowing the projection 68 to push the movable wedge 58 into clamped arrangement with respect to the seat belt webbing 26 as shown in FIG. 5.

As will be understood, in the foregoing embodiment, once the bell crank 80 has been released from its engagement with the end of actuator arm 64, spring 74 forces the movable wedge 58 into its clamped position with respect to the seat belt webbing 26. Accordingly, the mechanism must be reset before the seat belt webbing 26 can be moved in either direction.

Wherefore, having thus described our invention, we claim:

1. In a locking seat belt retractor apparatus for a vehicle having a frame mounted to the vehicle, a retractor reel mounted on the frame and having a safety belt webbing wound thereon for protraction and retraction and an inertia-activated pawl mounted on the frame for engaging the reel to prevent protraction of the safety belt webbing in an emergency, the improvement comprising:
   (a) means for slidably mounting the retractor reel on the frame for movement between an extended position and a retracted position;
   (b) biasing means for biasing the retractor reel toward said retracted position, said retractor reel being movable to said extended position by a protraction force on the safety belt webbing exceeding a threshold amount predetermined by the bias force of said biasing means;
   (c) clamping means mounted on the frame and having the safety belt webbing passing therethrough for selectively clamping the safety belt webbing against further movement relative to said clamping means, wherein said clamping means comprises a wedge-shaped clamp member and means for mounting said clamp member for movement from a webbing disengaging position to a webbing clamping position, said operating means includes, biasing means for normally biasing said clamp member toward a webbing clamping position, releasable retaining means for normally holding said wedge-shaped member against movement toward said webbing clamping position and protraction force-activated tripping means for operating said releasable retaining means to a released position whereby said wedge-shaped clamp member is moved by said biasing means to said webbing clamping position, said means for mounting said wedge-shaped clamp member includes a pivotally-mounted support bar underlying said wedge-shaped clamp member and said biasing means comprises a spring operably connected to said support bar, and said releasable retaining means comprises a bell-crank linkage operably connected between said protraction force-activated tripping means and said support bar whereby said linkage normally holds said bar against the bias of said spring and is released by rotation thereof by said protraction force activated tripping means; and, (d) operating means operably connected to said clamping means and said reel for operating said clamping means to clamp the safety belt webbing against further relative movement when said reel is in said extended position in response to a protractive force on the safety belt webbing which exceeds said predetermined threshold amount.

2. A safety belt webbing emergency locking apparatus comprising:

clamping means for selectively clamping safety belt webbing against further movement relative to said clamping means;

protraction force responsive means operably connected for operating said clamping means to clamp said webbing against further relative movement in response to a protraction force on said webbing of more than a predetermined amount, wherein said protraction force responsive means comprises:

(a) biasing means for normally biasing said wedge-shaped clamp member toward said webbing clamping position;

(b) releasable retaining means for normally holding said wedge-shaped clamp member against movement toward said webbing clamping position; and, (c) protraction force-activated tripping means for operating said releasable retaining means to a released position whereby said wedge-shaped clamp member is moved by said biasing means to said webbing clamping position;

wherein said means for mounting said wedge-shaped member includes a pivotally-mounted support bar underlying said wedge-shaped member and said biasing means comprising a spring operably connected to said support bar; and wherein said releasable retaining means comprises a bell-crank linkage operably connected between said protraction force-activated tripping means and said support bar whereby said linkage normally holds said bar against the bias of said spring and is released by rotation thereof by said protraction force activated tripping means.

3. The apparatus of claim 2 wherein:

said protraction force activated tripping means comprises a spring biased member pulled by the seat belt webbing during an emergency lockup state and associated means for engaging said bell-crank linkage means whereby movement of said member operates said linkage means to a released position.

4. In a locking seat belt retractor apparatus for a vehicle having an apparatus mounting frame mounted to the vehicle, a retractor reel mounted on a retractor frame and having a safety belt webbing wound thereon for protraction and retraction and an inertia-activated pawl mounted on the retractor frame for engaging the reel to prevent protraction of the safety belt webbing relative the reel and retractor frame in an emergency, the improvement comprising:

(a) means for slidably mounting the retractor frame on the apparatus frame for movement between an extended position and a retracted position;

(b) biasing means for biasing the retractor frame toward said retracted position, said retractor frame being movable to said extended position by a protraction force on the safety belt webbing exceeding a threshold amount predetermined by the bias force of said biasing means;

(c) clamping means mounted on the apparatus frame and having the safety belt webbing passing therethrough for selectively clamping the safety belt webbing against further movement relative to said clamping means; and, (d) operating means operably connected between said retractor frame and said clamping means for operating said clamping means to clamp the safety belt webbing against further relative movement in response to sliding movement of said retractor frame to said extended position on said apparatus frame in response to a protractive force on the safety belt webbing which exceeds said predetermined threshold amount when said pawl is in engagement with said reel.

5. A safety belt webbing emergency locking apparatus having a webbing storage emergency locking retractor mounted by a retractor frame to an apparatus frame for mounting of the apparatus to a vehicle said apparatus comprising;

(a) clamping means on said apparatus frame for selectively clamping safety belt webbing against further movement relative to said clamping means, said clamping means comprising a wedge-shaped clamp member and means for mounting said clamp member for movement from a webbing disengaging position to a webbing clamping position; and, (b) protraction force responsive means operably connected for operating said clamping means to clamp said webbing against further relative movement in response to a protraction force on said webbing of more than a predetermined amount, said protraction force responsive means comprising biasing means on said apparatus frame for normally biasing said clamp member towards said webbing clamping position, releasable retaining means on said apparatus frame for normally holding said clamp member against movement towards said webbing clamping position, tripping means on said apparatus frame for operating said releasable retaining means to a released position whereby said clamp member is moved by said biasing means to said webbing clamping position, and means for movably mounting said emergency locking retractor frame on said apparatus frame to operate said tripping means by movement of said retractor frame relative said apparatus frame under protractive force of said safety belt webbing.

* * * * *